(12) United States Patent
Lundberg et al.

(10) Patent No.: US 8,429,994 B2
(45) Date of Patent: Apr. 30, 2013

(54) HYDRAULIC CONTROL SYSTEMS FOR DUAL CLUTCH TRANSMISSIONS

(75) Inventors: Philip C. Lundberg, Keego Harbor, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 787 days.

(21) Appl. No.: 12/556,468

(22) Filed: Sep. 9, 2009

(65) Prior Publication Data

US 2011/0056315 A1 Mar. 10, 2011

(51) Int. Cl.
*F16H 59/00* (2006.01)

(52) U.S. Cl.
USPC .............................................. 74/335; 74/330

(58) Field of Classification Search ............... 74/330, 74/331, 335
See application file for complete search history.

(56) References Cited

U.S. PATENT DOCUMENTS

| | | | |
|---|---|---|---|
| 3,834,499 A | 9/1974 | Candellero et al. | |
| 4,495,839 A * | 1/1985 | Morscheck | 477/142 |
| 4,653,352 A | 3/1987 | Nakao et al. | |
| 4,805,750 A * | 2/1989 | Nitz | 192/3.58 |
| 4,944,202 A | 7/1990 | Gierer | |
| 5,054,369 A * | 10/1991 | Wardle et al. | 91/361 |
| 5,329,826 A * | 7/1994 | Graves et al. | 74/335 |
| 5,441,459 A | 8/1995 | Inukai et al. | |
| 5,588,327 A * | 12/1996 | Downs et al. | 74/335 |
| 5,851,164 A * | 12/1998 | Habuchi et al. | 477/127 |
| 6,343,520 B1 * | 2/2002 | Ohashi et al. | 74/335 |
| 6,698,304 B2 | 3/2004 | Gierling et al. | |
| 6,715,597 B1 | 4/2004 | Buchanan et al. | |
| 6,789,658 B2 | 9/2004 | Busold et al. | |
| 6,827,191 B2 | 12/2004 | Kuhstrebe | |
| 6,883,394 B2 * | 4/2005 | Koenig et al. | 74/335 |
| 6,941,830 B2 | 9/2005 | Ibamoto et al. | |
| 7,300,375 B2 | 11/2007 | Petrzik | |
| 7,401,689 B2 | 7/2008 | Hegerath et al. | |
| 7,464,617 B2 | 12/2008 | Baldascini et al. | |
| 7,464,618 B2 | 12/2008 | Mohlmann et al. | |
| 7,472,616 B2 | 1/2009 | Dreher et al. | |
| 7,478,572 B2 | 1/2009 | Maten et al. | |
| 7,487,866 B2 | 2/2009 | Kruse et al. | |
| 7,591,203 B2 | 9/2009 | Ochi et al. | |
| 7,736,269 B2 * | 6/2010 | Long et al. | 477/130 |
| 2001/0036878 A1 | 11/2001 | Itou et al. | |
| 2002/0060113 A1 | 5/2002 | Harries | |
| 2002/0119864 A1 | 8/2002 | Harries | |
| 2003/0075408 A1 | 4/2003 | Alfredsson | |
| 2003/0226416 A1 | 12/2003 | Umemoto et al. | |

(Continued)

FOREIGN PATENT DOCUMENTS

| | | |
|---|---|---|
| DE | 4117736 C1 | 5/1992 |
| DE | 4320353 A1 | 1/1994 |

(Continued)

*Primary Examiner* — Ha D. Ho

(57) ABSTRACT

Hydraulic control systems for a dual clutch transmission include a regulated source of pressurized hydraulic fluid including an electric pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

18 Claims, 8 Drawing Sheets

U.S. PATENT DOCUMENTS

Figure 1:
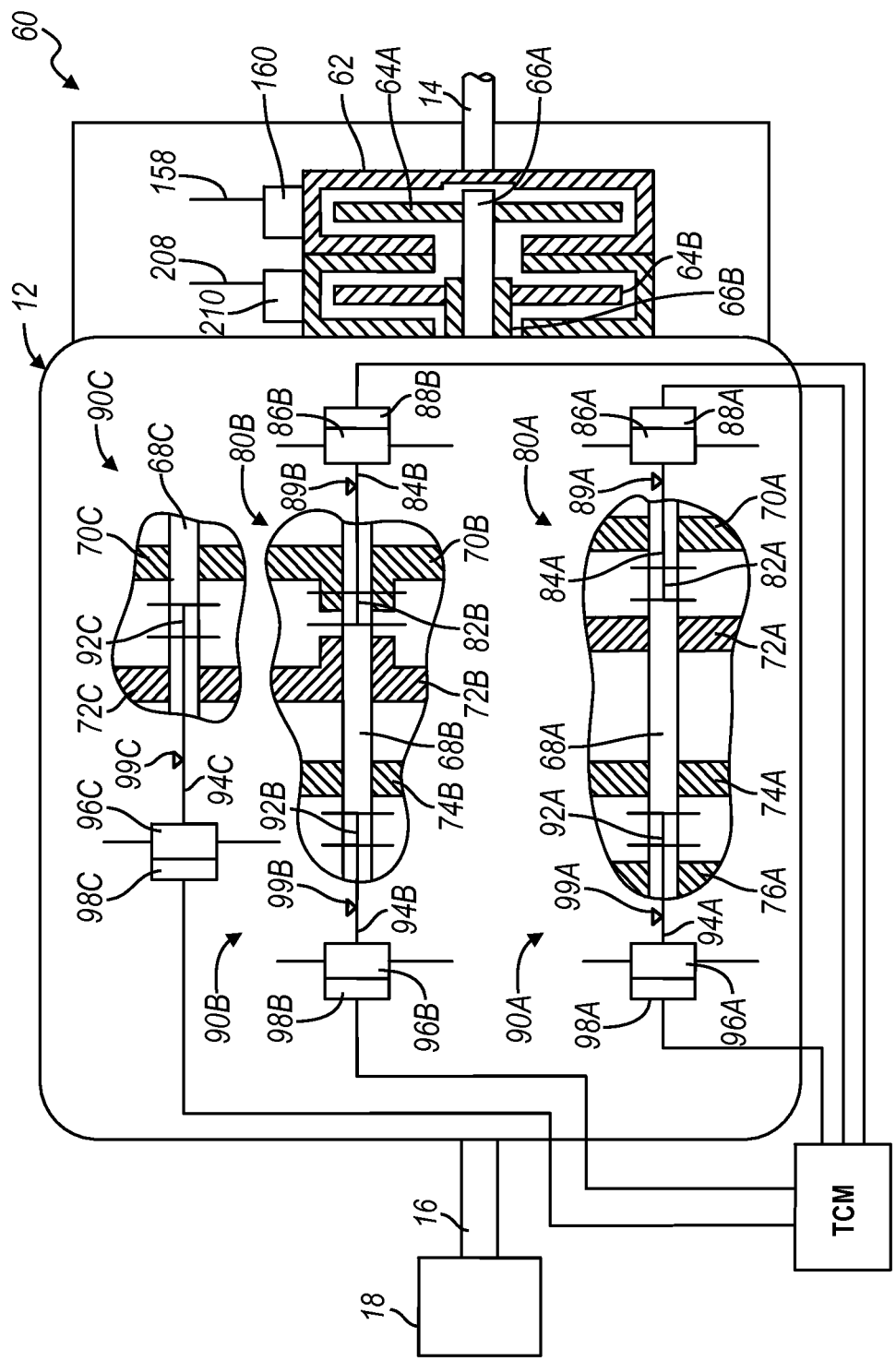

| | | |
|---|---|---|
| 2004/0038765 A1 | 2/2004 | Fujimine et al. |
| 2005/0067251 A1 | 3/2005 | Braford, Jr. et al. |
| 2005/0107214 A1 | 5/2005 | Koenig |
| 2007/0175726 A1 | 8/2007 | Combes et al. |
| 2008/0176700 A1* | 7/2008 | Long et al. .................. 475/116 |
| 2008/0207392 A1 | 8/2008 | Staudinger et al. |
| 2008/0210032 A1 | 9/2008 | Uberti et al. |
| 2008/0223683 A1 | 9/2008 | Grethel |
| 2009/0000897 A1 | 1/2009 | Staudinger et al. |
| 2009/0151495 A1 | 6/2009 | Garabello et al. |
| 2009/0157271 A1 | 6/2009 | Garabello et al. |

FOREIGN PATENT DOCUMENTS

| | | |
|---|---|---|
| DE | 19921301 A1 | 11/1999 |
| DE | 19849488 A1 | 5/2000 |
| DE | 19931973 A1 | 1/2001 |
| DE | 10125172 A1 | 11/2002 |
| DE | 10134115 A1 | 1/2003 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| DE | 102008008454 A1 | 9/2008 |
| DE | 102008058692 A1 | 6/2009 |
| EP | 1400733 A2 | 3/2004 |
| EP | 1433976 A1 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9919644 A1 | 4/1999 |
| WO | WO2004097265 A1 | 11/2004 |
| WO | WO2009037170 A1 | 3/2009 |
| WO | WO2010028745 A2 | 3/2010 |

* cited by examiner

HYDRAULIC CONTROL SYSTEMS FOR DUAL CLUTCH TRANSMISSIONS

FIELD

The present disclosure relates to hydraulic control systems and more particularly to hydraulic control systems and their components for dual clutch transmissions.

BACKGROUND

The statements in this section merely provide background information related to the present disclosure and may or may not constitute prior art.

In automotive transmission art, the dual clutch transmission (DCT) is a relatively new concept. A typical dual clutch transmission configuration includes a pair of mutually exclusively operating input clutches which drive a pair of input shafts. The input shafts may be disposed on opposite sides of an output shaft or may be disposed concentrically between spaced-apart output shafts. One of each of a plurality of pairs of constantly meshing gears which provide the various forward and reverse gear ratios is freely rotatably disposed on one of the shafts and the other of each pair of gears is coupled to one of the other shafts. A plurality of synchronizer clutches selectively couple the freely rotatable gears to the associated shaft to achieve forward and reverse gear ratios. After the synchronizer clutch is engaged, the input clutch associated with the input shaft having the engaged synchronizer clutch is applied to transmit power through the transmission. Reverse gear is similarly achieved except that it includes an additional (idler) gear to provide torque reversal.

Dual clutch transmissions are known for their sporty, performance oriented operating characteristics which mimic those of a conventional (manual) transmission. They also typically exhibit good fuel economy due to their good gear mesh efficiency, ratio selection flexibility, reduced clutch losses and the lack of a torque converter.

There are several design considerations unique to dual clutch transmissions. For example, because of heat generated during clutch slip, the input clutches must be of relatively large size. Furthermore, such heat generation typically requires correspondingly larger and more complex cooling components capable of dissipating relatively large quantities of heat. Finally, because such transmissions typically have many sets of axially aligned, meshing gears, their overall length may limit their use to certain vehicle designs.

Control of the input clutches and selection and engagement of a particular gear by translation of a synchronizer and associated positive clutch is typically achieved by a hydraulic control system. Such a system, itself under the control of an electronic transmission control module (TCM), includes hydraulic valves and actuators which engage the synchronizers and gear clutches. Optimum operating efficiency and thus fuel efficiency and minimal heat generation can be achieved by designing such hydraulic control systems to exhibit low leakage and positive control characteristics. The present invention is so directed.

SUMMARY

The present invention comprehends two embodiments of a hydraulic control system for a dual clutch transmission having three countershafts, an idler shaft and five shift rails and hydraulic actuators. The hydraulic control systems include a regulated source of pressurized hydraulic fluid including a pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

The embodiments define essentially independent control systems supplied with hydraulic fluid through two independently operating valves. The independent control systems are associated with respective transmission countershafts and, generally speaking, one countershaft is associated with the even-numbered gears (second, fourth, etc.) and the other countershaft is associated with the odd-numbered gears (first, third, etc.). When the transmission is operating in a normal ascending or descending gear selection sequence, this configuration generally permits pre-staging or pre-selection of a gear associated with one countershaft while a gear associated with the other countershaft is engaged and transmitting torque. Furthermore, if a component or components associated with one countershaft fail, the other countershaft and the alternating (i.e., first, third, fifth) selection of gear ratios it provides will still be fully operational—a highly desirable failure mode.

The hydraulic control systems according to the present invention are less complex and expensive relative to competing systems, provide improved control through interconnected logic valves which reduce the likelihood of engaging a wrong or multiple gears and provide reduced energy consumption by allowing shut-down of portions of the control system during steady state operation. The control systems utilize pairs of pressure, flow control valves, on/offs or a combination of components to control both sides of shift actuator pistons which provides better control and improved shifts.

Thus it is an object of the present invention to provide a hydraulic control system for a dual clutch automatic transmission.

It is a further object of the present invention to provide a hydraulic control system for a dual clutch transmission having a plurality of spool or logic valves and hydraulic actuators.

It is a still further object of the present invention to provide a hydraulic control system for a dual clutch transmission having a plurality of two position solenoid valves (on-offs), spool valves and hydraulic actuators.

It is a still further object of the present invention to provide a hydraulic control system for a dual clutch transmission having a plurality of flow or pressure control valves, two position solenoid valves, logic or spool valves and hydraulic actuators.

It is a still further object of the present invention to provide a hydraulic control system for a dual clutch transmission comprising two essentially independent hydraulic systems, each associated with a respective transmission countershaft.

It is a still further object of the present invention to provide a hydraulic control system for a dual clutch transmission having a pair of input clutches associated with a pair of concentric input shafts and a plurality of countershafts.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2A:
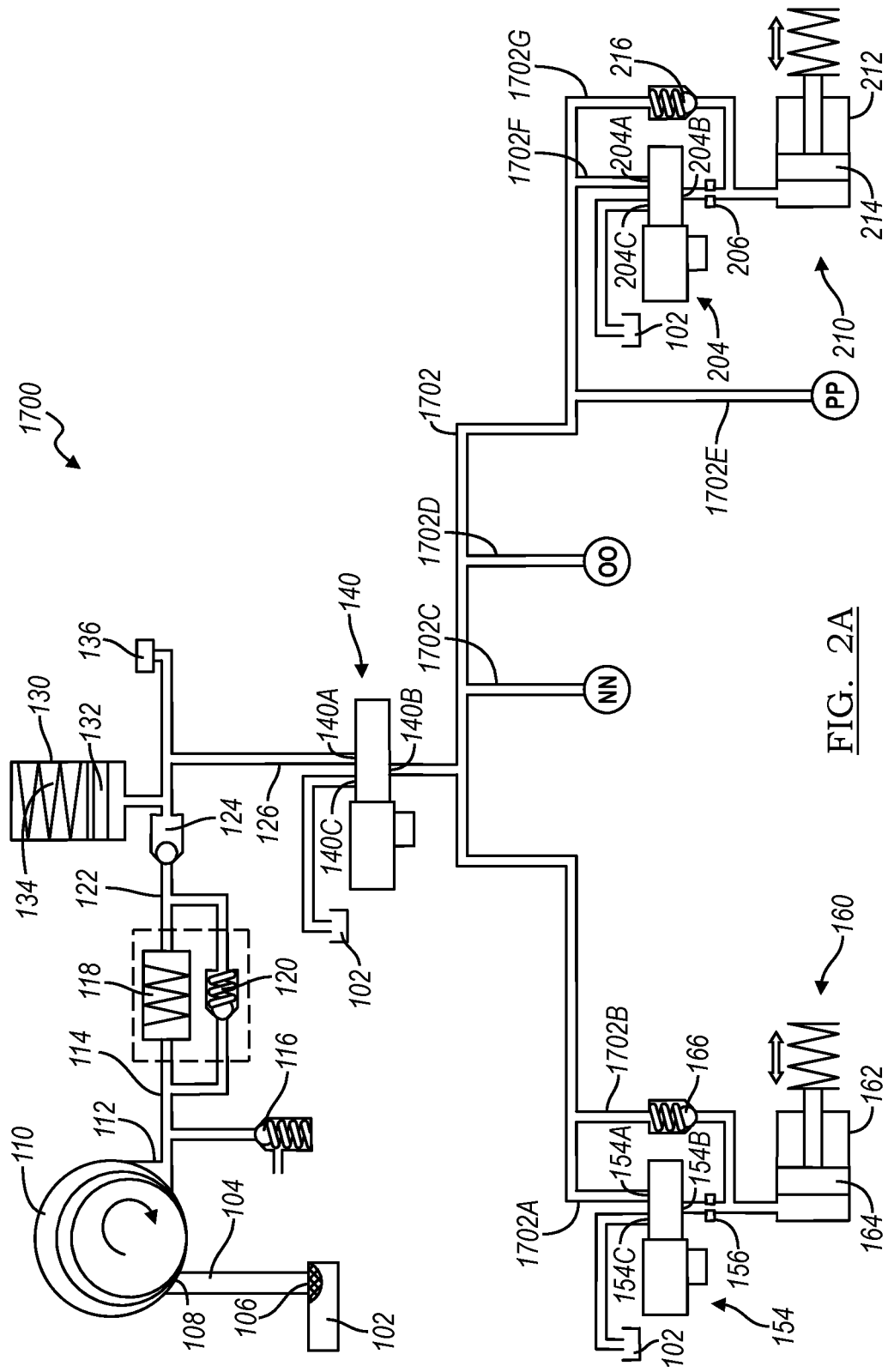
Figure 2B:
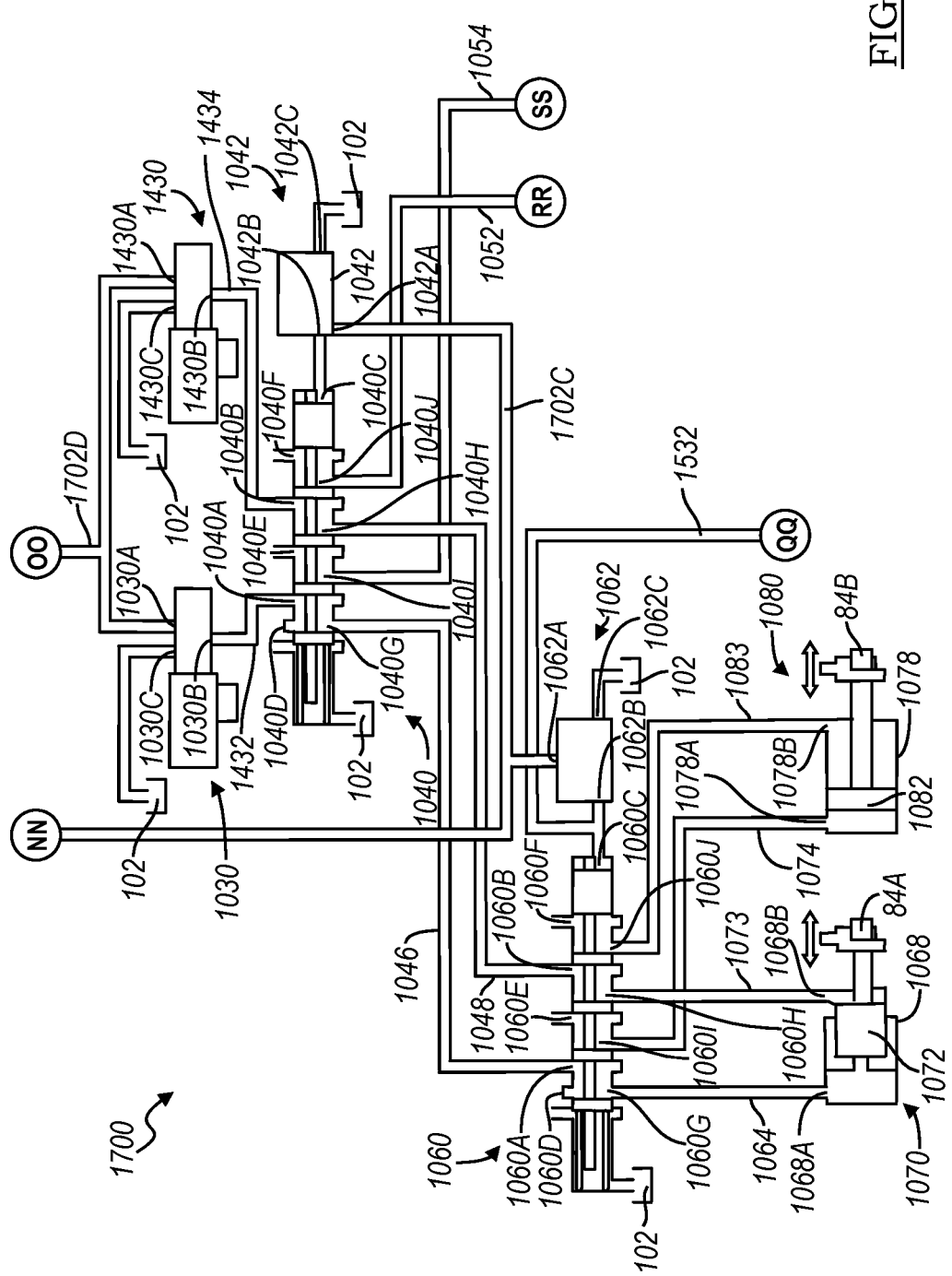
Figure 2C:
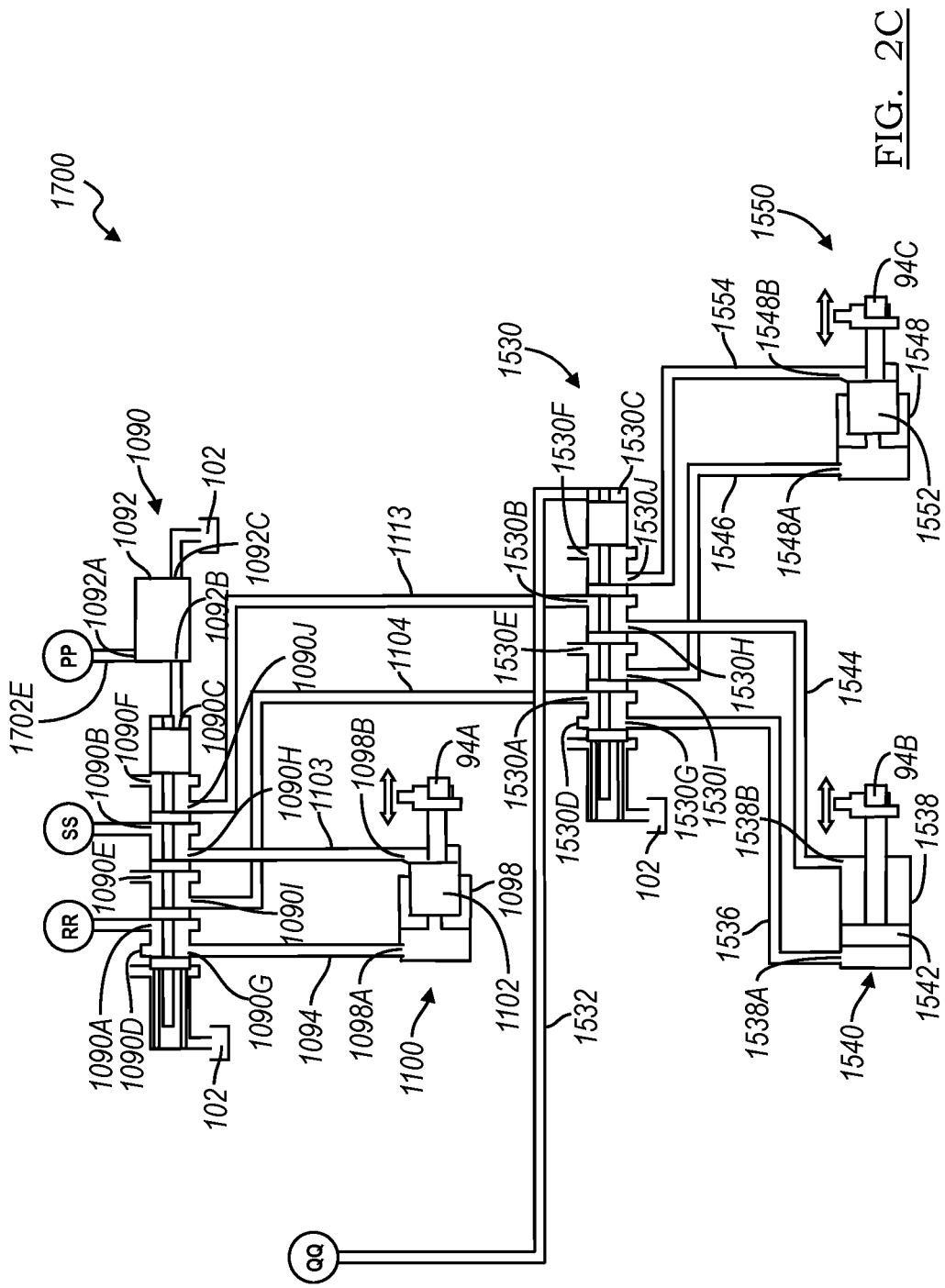
Figure 3A:
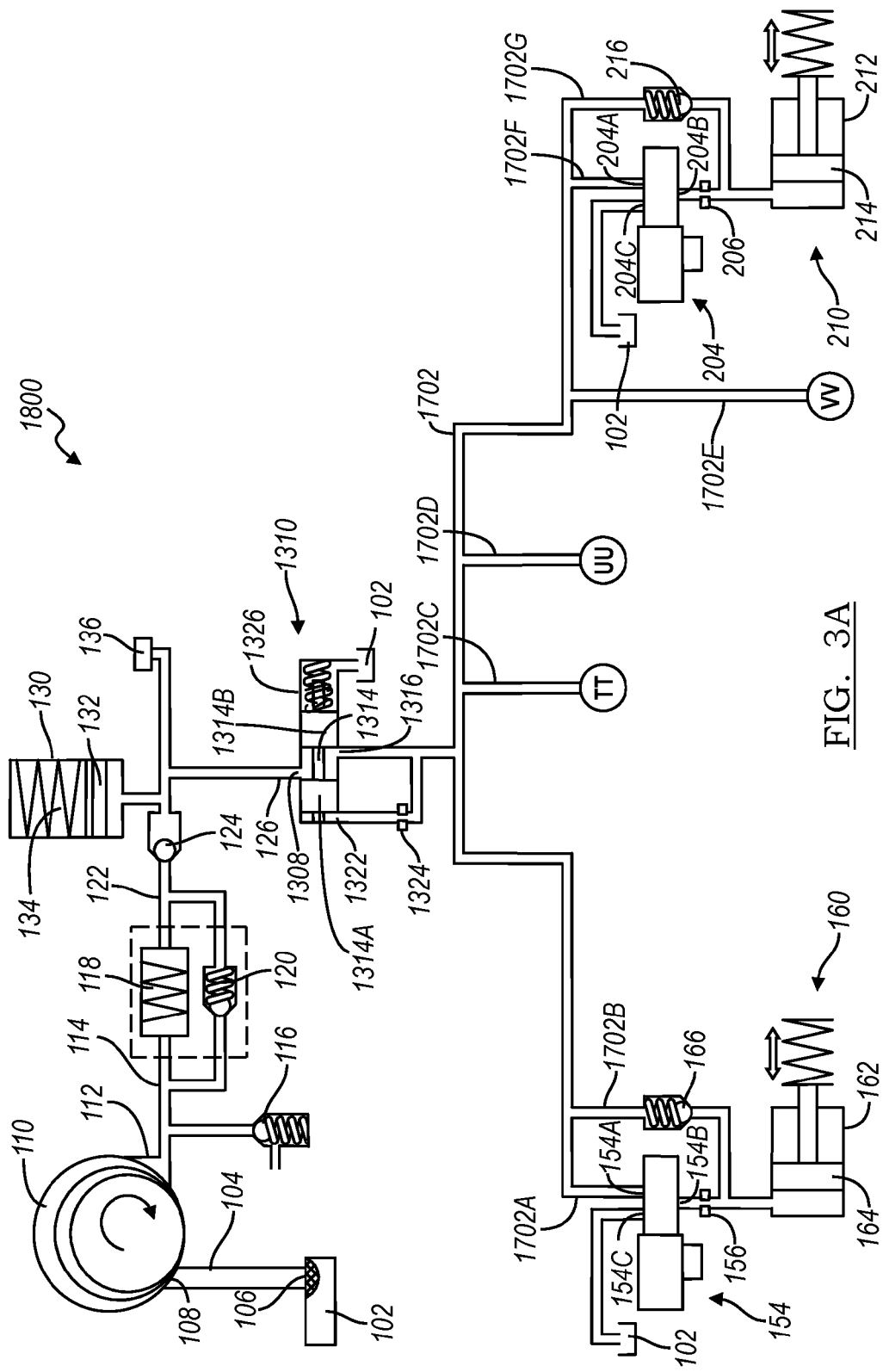
Figure 3B:
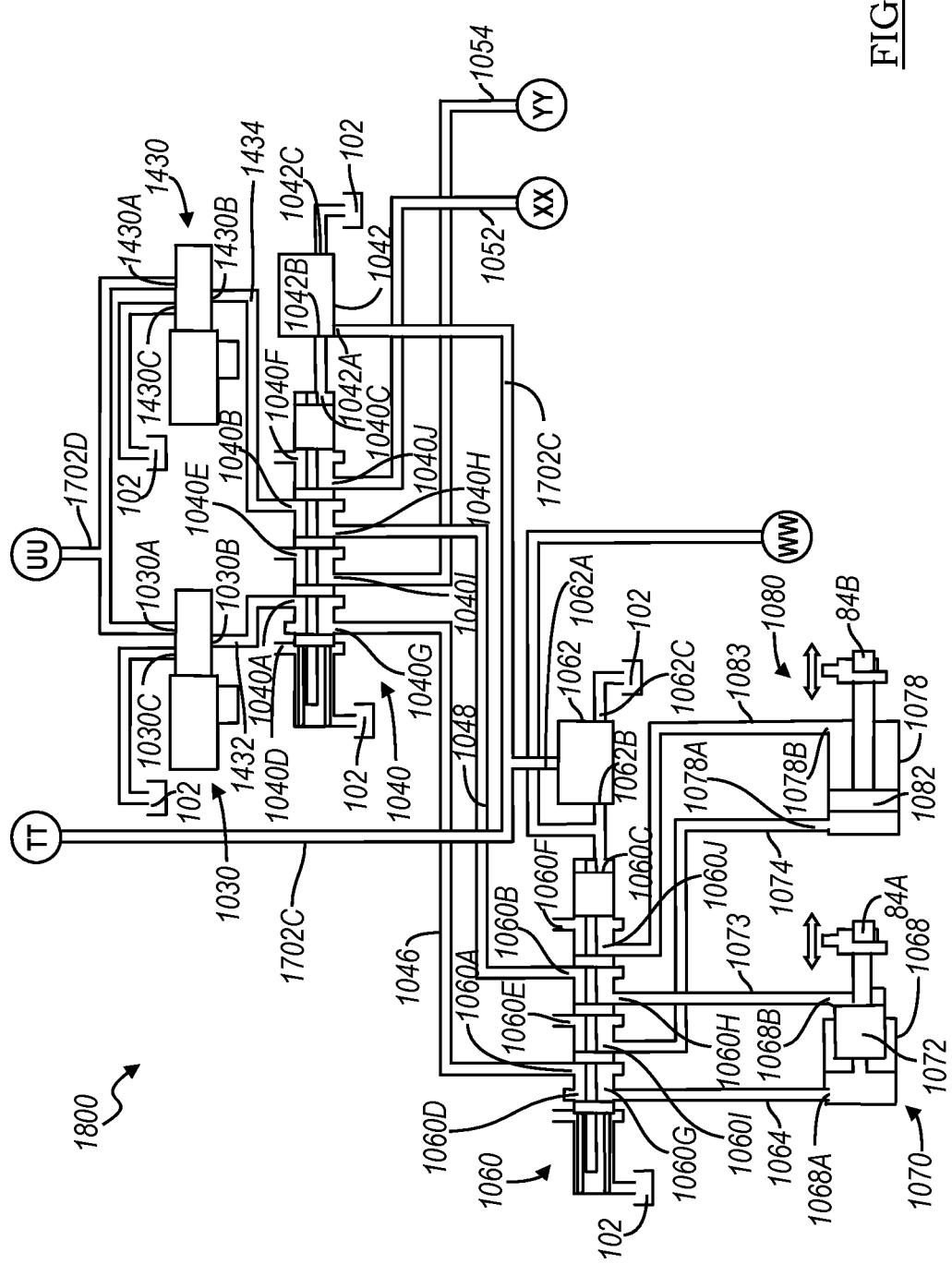
Figure 3C:
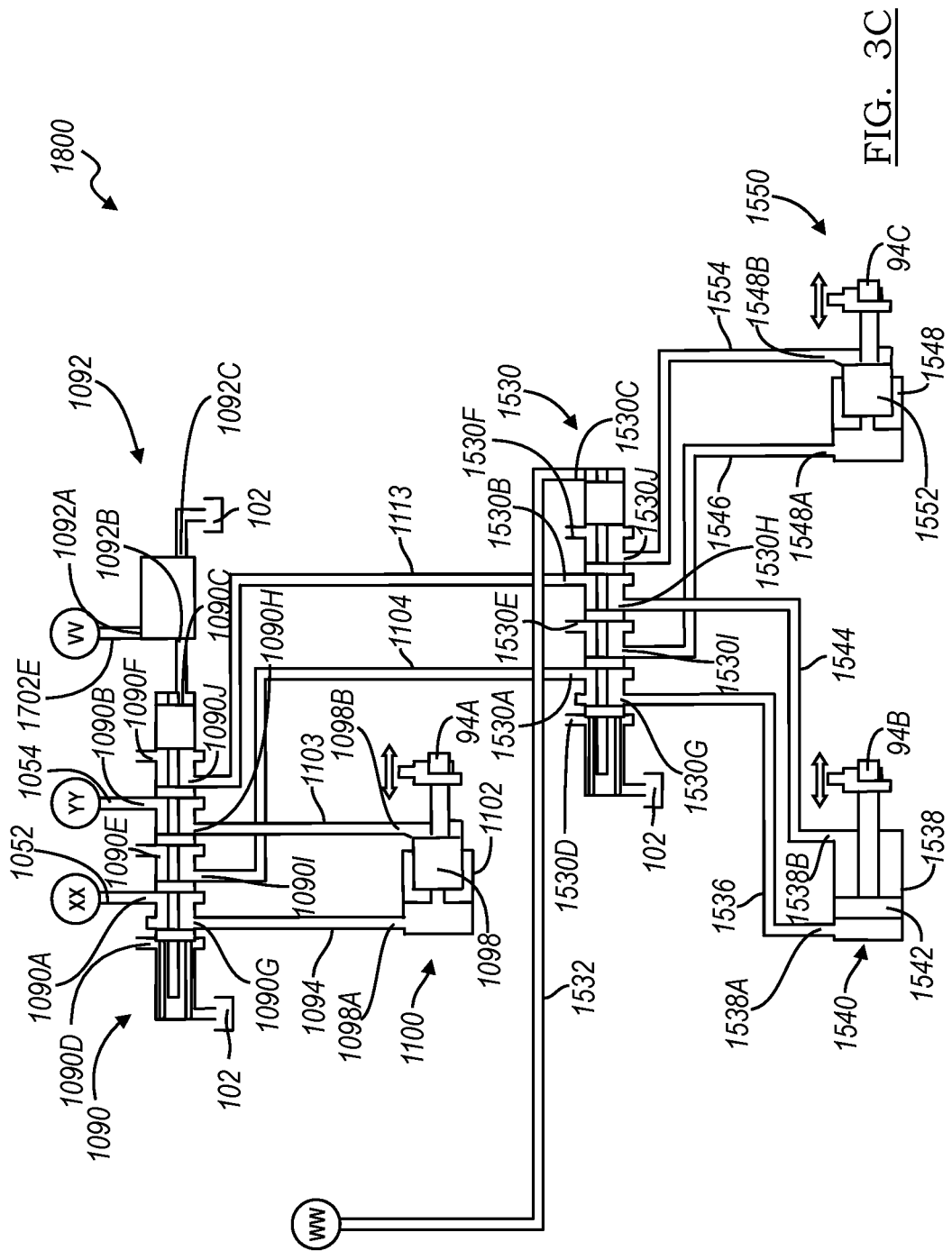
Figure 4:
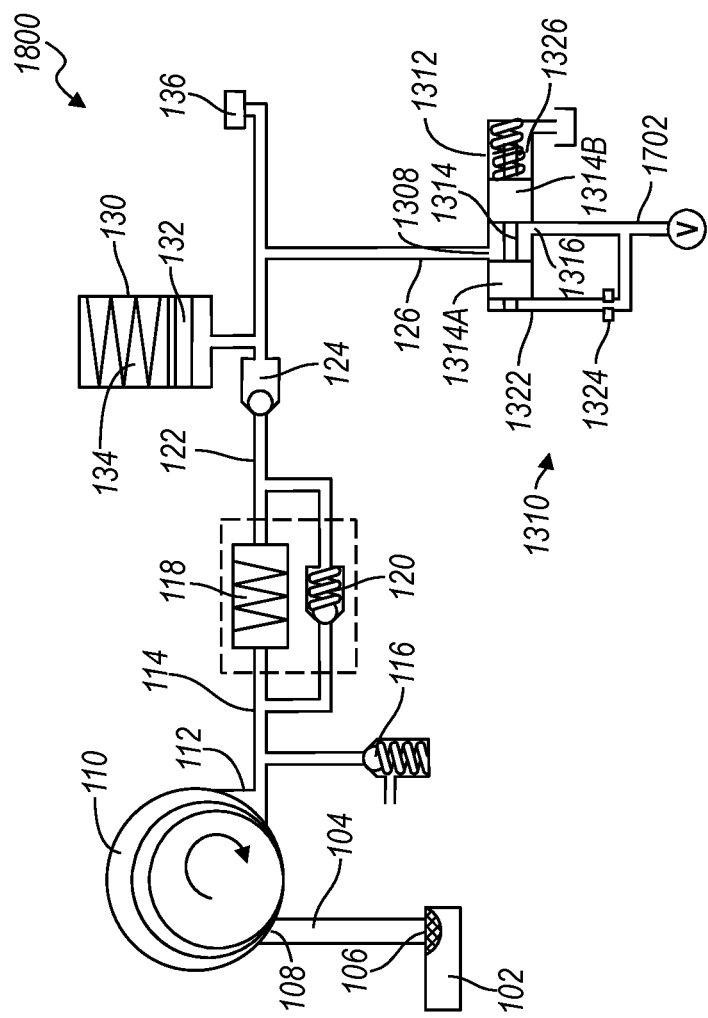

FIG. 1 is a pictorial view of an exemplary dual clutch automatic transmission with portions broken away incorporating a hydraulic control system according to the present invention having five shift actuator assemblies;

FIGS. 2A, 2B and 2C are schematic flow diagrams of a first embodiment of a hydraulic control system according to the present invention for a dual clutch automatic transmission; and FIGS. 3A, 3B and 3C are schematic flow diagrams of a second embodiment of a hydraulic control system according to the present invention for a dual clutch automatic transmission; and FIG. 4 is an enlarged view of a portion of the second embodiment of a hydraulic control system illustrating a passive pressure regulator according to the present invention.

DETAILED DESCRIPTION

The following description is merely exemplary in nature and is not intended to limit the present disclosure, application, or uses.

With reference to FIG. 1, an exemplary dual clutch automatic transmission incorporating the present invention is illustrated and generally designated by the reference number 60. The dual clutch transmission 60 includes a typically cast, metal housing 12 which encloses and protects the various components of the transmission 60. The housing 12 includes a variety of apertures, passageways, shoulders and flanges (not illustrated) which position and support the components of the transmission 60. The transmission 60 includes an input shaft 14 which receives motive power from a prime mover (not illustrated) such as an internal combustion gas or Diesel engine or a hybrid or electric power plant and a single or double output shaft 16 which drives a final drive assembly 18 which may include a propshaft, a differential and drive axles. The input shaft 14 is coupled to and drives a clutch housing 62. The clutch housing 62, in turn, drives a pair of concentrically disposed dry input clutches, a first input clutch 64A and a second input clutch 64B which are mutually exclusively engaged to provide drive torque to a respective pair of concentric input members, a first or inner input shaft 66A and a second or outer hollow input shaft or quill 66B.

Secured to and rotating with each of the input members 66A and 66B are a plurality of helical or spur gears (not illustrated) which are in constant mesh with helical or spur gears which are freely rotatably disposed on a first layshaft or countershaft 68A and a parallel, second layshaft or countershaft 68B. Adjacent and parallel to the second countershaft is a third layshaft or countershaft 68C. A first drive gear meshes with a first driven gear 70A on the first countershaft 68A. A second drive gear meshes with a second driven gear 72A on the first countershaft 68A. A third drive gear meshes with a third driven gear 74A on the first countershaft 68A. A fourth drive gear meshes with a fourth driven gear 76A on the first countershaft 68A. A fifth driven gear 70B on the second countershaft 68B meshes with a fifth drive gear 70C on the third countershaft 68C. The second drive gear also meshes with a sixth driven gear 72B on the second countershaft 68B which meshes with a seventh driven gear 72C on the third countershaft 68C. An eighth drive gear meshes with an eighth driven gear 74B on the second countershaft 68B.

Disposed either adjacent certain single gears or between adjacent pairs of gears on the countershafts 68A, 68B and 68C are synchronizer clutch assemblies. Each synchronizer clutch assembly, in accordance with conventional practice, includes a synchronizer assembly which, when activated, synchronizes the speed of a gear to that of the associated countershaft and a positive clutch, such as a dog or face clutch, which positively connects the gear to the shaft. Thus, between the driven gears 70A and 72A on the first countershaft 68A is a first shift actuator and synchronizer clutch assembly 80A having a double, i.e., back-to-back, first synchronizer clutch 82A which selectively and exclusively synchronizes and engages one of the gears 70A and 72A to the first countershaft 68A. The first synchronizer clutch 82A is bi-directionally translated by a first shift rail and fork assembly 84A which, in turn, is translated by a first shift actuator assembly 86A. The real time position of the first synchronizer clutch 82A and the first shift rail and fork assembly 84A is sensed by a first linear position sensor 88A which preferably provides a continuous, i.e., proportional, output signal to a transmission control module TCM indicating the position of the first synchronizer clutch 82A.

Between the fifth driven gear 70B and the sixth driven gear 72B on the second countershaft 68B is a second shift actuator and synchronizer clutch assembly 80B having a single synchronizer clutch 82B which synchronizes and couples the fifth and the sixth gears 70B and 72B together. The second synchronizer clutch 82B is bi-directionally translated by a second shift rail and fork assembly 84B which, in turn, is translated by a second shift actuator assembly 86B. The real time position of the second synchronizer clutch 82B and the second shift rail and fork assembly 84B is sensed by a second linear position sensor 88B which preferably provides a continuous, i.e., proportional, output signal to the transmission control module TCM indicating the position of the second synchronizer clutch 82B.

Between the driven gears 74A and 76A on the first countershaft 68A is a third shift actuator and synchronizer clutch assembly 90A having a double, i.e., back-to-back, third synchronizer clutch 92A which selectively and exclusively synchronizes and engages one of the gears 74A and 76A to the first countershaft 68A. The third synchronizer clutch 92A is bi-directionally translated by a third shift rail and fork assembly 94A which, in turn, is translated by a third shift actuator assembly 96A. The real time position of the third synchronizer clutch 92A and the third shift rail and fork assembly 94A is sensed by a third linear position sensor 98A which preferably provides a continuous, i.e., proportional, output signal to the transmission control module TCM indicating the position of the third synchronizer clutch 92A.

Adjacent the eighth driven gear 74B on the second countershaft 68B is a fourth shift actuator and synchronizer clutch assembly 90B having a single synchronizer clutch 92B which synchronizes and couples the eighth driven gear 74B to the second countershaft 68B. The fourth synchronizer clutch 92B is bi-directionally translated by a fourth shift rail and fork assembly 94B which, in turn, is translated by a fourth shift actuator assembly 96B. The real time position of the fourth synchronizer clutch 92B and the fourth shift rail and fork assembly 94B is sensed by a fourth linear position sensor 98B which preferably provides a continuous, i.e., proportional, output signal to the transmission control module TCM indicating the position of the fourth synchronizer clutch 92B.

Finally, between the fifth drive gear 70C and the seventh driven gear 72C on the third countershaft 68C is a fifth shift actuator and synchronizer clutch assembly 90C having a double, i.e., back-to-back, synchronizer clutch 92C which selectively and exclusively synchronizes and engages the driven gear 72C to the third countershaft 68C or couples the driven gear 72C to the drive gear 70C. The fifth synchronizer clutch 92C is bi-directionally translated by a fifth shift rail and fork assembly 94C which, in turn, is translated by a fifth shift actuator assembly 96C. The real time position of the fifth synchronizer clutch 92C and the fifth shift rail and fork assembly 94C is sensed by a fifth linear position sensor 98C which preferably provides a continuous, i.e., proportional, output signal to the transmission control module TCM indicating the position of the fifth synchronizer clutch 92C. It should be understood that the linear position sensors 88A, 88B, 98A, 98B and 98C may be replaced with other sensors such as two or three position switches or open loop control with system characterization.

Additionally, a detent mechanism may be employed with each of the shift assemblies to assist obtaining and maintaining a gear or speed ratio once it is selected and to assist obtaining and maintaining the synchronizer clutch in neutral, i.e., an unengaged position. Thus, a first detent assembly 89A may be operatively associated with the first shift actuator and synchronizer clutch assembly 80A. A second detent assembly 89B may be operatively associated with the second shift actuator and synchronizer clutch assembly 80B. A third detent assembly 99A may be operatively associated with the third shift actuator and synchronizer clutch assembly 90A. A fourth detent assembly 99B may be operatively associated with the fourth shift actuator and synchronizer clutch assembly 90B and a fifth detent assembly 99C may be operatively associated with the fifth shift actuator and synchronizer clutch assembly 90C.

It will be appreciated that the transmission 60 illustrated and described above is laid out with four forward gears on one countershaft and the remaining (three) forward gears and reverse on two other countershafts. It is thus capable of providing seven forward speeds and reverse. Similar configurations, all deemed to be within the scope of this invention may, for example, include six forward speeds (or gears) and one or two reverse speeds (or gears) or five forward speeds and one or two reverse speeds.

It should be understood that while the present invention is directed to hydraulic control systems for dual clutch transmissions, such systems are typically controlled by sensor signals and memory, software and one or more microprocessors contained in a transmission control module TCM. Thus, the transmission control module TCM includes a plurality of inputs which receive data from, for example, the linear position sensors, the speed sensors, and the pressure sensor; and a plurality of outputs which control and modulate, for example, the positions of the clutches, shift rails and logic solenoid valves.

Referring now to FIGS. 1, 2A, 2B and 2C, a first embodiment of a hydraulic control system for the dual clutch automatic transmission 60 described above is illustrated and designated by the reference number 1700. The hydraulic control system 1700 includes a sump 102 to which hydraulic fluid returns and collects from various components and regions of the automatic transmission 60. A suction line 104 which may include a filter 106 communicates with the inlet port 108 of an engine driven or electric pump 110 which may be, for example, a gear pump, a vane pump, a gerotor pump or other positive displacement pump. An outlet port 112 of the pump 110 provides hydraulic fluid under pressure in a supply line 114 to a spring biased blow-off safety valve 116 and to a pressure side filter 118 which is disposed in parallel with a spring biased check valve 120. The safety valve 116 is set at a relatively high predetermined pressure and if the pressure in the supply line 114 exceeds this pressure, the safety valve 116 opens momentarily to relieve and reduce it. If pressure ahead of the filter 118 rises to a predetermined differential pressure, indicating a partial blockage or flow restriction when cold of the filter 118 and the possibility that insufficient hydraulic fluid may be provided in an outlet line 122 to the remainder of the control system 1700, the check valve 120 opens to allow hydraulic fluid to bypass the filter 118.

A second check valve 124, in the outlet line 122, is configured to maintain hydraulic pressure in a main supply line 126 and to prevent backflow through the pump 110. The main supply line 126 supplies pressurized hydraulic fluid to an accumulator 130 having a piston 132 and a biasing compression spring 134. The accumulator 130 may be one of many other designs including a gas filled piston accumulator. The accumulator 130 stores pressurized hydraulic fluid and supplies it to the main supply line 126, to a main or system pressure sensor 136 and to the other components of the control system 1700 thereby eliminating the need for either an engine driven pump or an electric pump 110 to run continuously. The main pressure sensor 136 reads the delivered hydraulic system pressure in real time and provides this data to the transmission control module TCM.

It should be appreciated that the other embodiment of the hydraulic control system according to the present invention preferably includes the same hydraulic supply, filtration and control components just described. Accordingly, these components will be only briefly described in connection with the subsequent figure and embodiment, it being understood that the above description may be referenced to provide details of these components.

The main supply line 126 communicates with an inlet port 140A of a pressure control solenoid valve 140. An outlet port 140B of the pressure control solenoid valve 140 communicates with a branching manifold 1702 and an exhaust port 140C communicates with the sump 102.

A first branch 1702A of the branching manifold 1702 communicates with an inlet port 154A of a first electric pressure or flow clutch control solenoid valve 154. The first clutch control solenoid valve 154 also includes an outlet port 154B and an exhaust port 154C which communicates with the sump 102. When the clutch control solenoid valve 154 is activated or energized, pressurized hydraulic fluid is provided through a flow control orifice 156 in a line 158 to a first clutch piston and cylinder assembly 160. It should be understood that the addition or removal of flow control orifices in all the hydraulic lines of the hydraulic control system 1700 and the other embodiment is within the purview of the present invention. The locations and sizes of the flow control orifices are based on operational, software and algorithm requirements. Thus, it should be understood that the incorporation or omission of flow control orifices in all the hydraulic lines is within the scope of the present invention.

Slidably disposed within a cylinder 162 is a single acting piston 164 which translates to the right in FIG. 2A under hydraulic pressure to engage the first input clutch 64A, illustrated in FIG. 1. When the first clutch control solenoid valve 154 is de-energized, the inlet port 154A is closed and hydraulic fluid from the cylinder 162 passes from the outlet port 154B to the exhaust port 154C and into the sump 102. A second branch 1702B of the branching manifold 1702 communicates with the output of a first clutch pressure limit control valve 166. If pressure within the first clutch piston and cylinder assembly 160 exceeds a predetermined pressure determined by the pressure control solenoid 140, the first pressure limit control valve 166 opens to relieve and reduce the pressure. It should be noted that the first pressure limit control valve 166 can be eliminated depending upon the system requirements.

A sixth branch 1702F of the branching manifold 1702 communicates with an inlet port 204A of a second electric pressure or flow clutch control solenoid valve 204. The second clutch control solenoid valve 204 also includes an outlet port 204B and an exhaust port 204C which communicates with the sump 102.

When the second clutch control solenoid valve 204 is activated or energized, pressurized hydraulic fluid is provided through an orifice 206 in a line 208 to a second clutch piston and cylinder assembly 210. Slidably disposed within a cylinder 212 is a single acting piston 214 which translates under hydraulic pressure to the right in FIG. 2A, to engage the second input clutch 64B, illustrated in FIG. 1. When the second clutch control solenoid valve 204 is inactive or de-energized, the inlet port 204A is closed off and hydraulic fluid from the cylinder 212 passes from the outlet port 204B to the exhaust port 204C and into the sump 102. A seventh branch 1702G of the branching manifold 1702 communicates with the output of a clutch pressure limit control valve 216. If pressure within the second clutch piston and cylinder assembly 210 exceeds a predetermined pressure supplied by the pressure control solenoid 140, then the pressure limit control valve 216 opens to relieve and reduce the pressure. It should be noted that the second pressure limit control valve 216 can be eliminated depending upon the system requirements.

A fourth branch 1702D of the branching manifold 1702 communicates with the inlet port 1030A of a first electric pressure or flow control solenoid valve 1030. An outlet port 1030B of the first pressure or flow control solenoid valve 1030 is connected by a first hydraulic line 1432 with a first inlet port 1040A of the first spool or logic control valve 1040. An exhaust port 1030C of the first pressure or flow control solenoid valve 1030 communicates with the sump 102. The fourth branch 1702D of the branching manifold 1702 also communicates with an inlet port 1430A of a second electric pressure or flow control solenoid valve 1430. A second hydraulic line 1434 communicates between an outlet port 1430B of the second electric pressure or flow control solenoid valve 1430 and a second inlet port 1040B of the first spool or logic valve 1040. An exhaust port 1430C communicates with the sump 102. It should be noted that instead of feeding the main manifold 1702C and 1702D from the control port 140B, they could be connected to the higher pressure of the main supply line 126 for a slightly different embodiment. This will remove some flow demand from the pressure control solenoid valve 140 but also changes the failure modes.

The first spool or logic valve 1040 includes a control port 1040C which is selectively supplied pressurized hydraulic fluid from an outlet port 1042B of a first two position solenoid (on-off) valve 1042 which, in turn, is supplied with pressurized hydraulic fluid at an inlet port 1042A from a third branch 1702C of the branching manifold 1702. When the first two position solenoid valve 1042 is energized, the spool of the first logic valve 1040 translates to the left in FIG. 2B; when the first two position solenoid valve 1042 is de-energized, the spool of the first logic valve 1040 translates to the right and returns hydraulic fluid to the sump 102 through an exhaust port 1042C. It should be understood that the method by which the logic valves change states are not limited to hydraulic on/offs. For example, other concepts replace the on/off hydraulic actuation of the logic valve with a solenoid armature and coil which acts directly on the logic valve spool. Additionally some of the on/off valves described below which actuate the logic valves can be multiplexed where a single on/off valve moves multiple logic valves. The first spool or logic valve 1040 also includes three exhaust ports 1040D, 1040E, and 1040F disposed between and alternating with the inlet ports 1040A and 1040B which communicate with the sump although, for reasons of clarity, such connections are not shown. It should be understood that slight modifications can be done to the logic valves and ports without changing the function of the system or deviating from the scope of this patent.

A hydraulic line 1046 communicates between a first outlet port 1040G of the first spool or logic valve 1040 and a first input port 1060A of a second spool or logic valve 1060. Another hydraulic line 1048 communicates between a third outlet port 1040H of the first spool or logic valve 1040 and a second input port 1060B of the second spool or logic valve 1060. Another hydraulic line 1052 connects the fourth outlet port 1040J of the first spool or logic valve 1040 to the first inlet port 1090A of a third spool or logic valve 1090. Another hydraulic line 1054 connects the second outlet port 1040I of the first spool or logic valve 1040 to the second inlet port 1090B of the third spool or logic valve 1090.

The second spool or logic valve 1060 includes a control port 1060C and three exhaust ports 1060D, 1060E, and 1060F which communicate with the sump 102, although such connections are not shown for reasons of clarity. A second two position (on-off) solenoid valve 1062 includes an inlet port 1062A which receives hydraulic fluid through a third branch 1702C of the branching manifold 1702 and selectively supplies it through an outlet port 1062B to the control port 1060C of the second logic valve 1060. When the second two position solenoid valve 1062 is energized, the spool of the second logic valve 1060 translates to the left in FIG. 2B; when the second two position solenoid valve 1062 is de-energized, the spool of the second logic valve 1060 translates to the right, returning hydraulic fluid through an exhaust port 1062C to the sump 102.

Two hydraulic lines 1064 and 1073 communicate between the first and the third outlet ports 1060G and 1060H of the second logic valve 1060 and two ports 1068A and 1068B in opposite ends of a first, preferably dual area piston and cylinder assembly 1070 which includes a cylinder 1068 and a piston 1072. The first piston and cylinder assembly 1070 translates the first shift rail and fork assembly 84A to select one of two gears. Two additional hydraulic lines 1074 and 1083 communicate between the second and fourth outlet ports 1060I and 1060J of the second logic valve 1060 and two ports 1078A and 1078B in opposite ends of a second piston and cylinder assembly 1080 which includes a cylinder 1078 and a piston 1082. The second piston and cylinder assembly 1080 translates the second shift rail and fork assembly 84B to select a single gear.

The third spool or logic valve 1090 includes a control port 1090C and three exhaust ports 1090D, 1090E, and 1090F which communicate with the sump 102. A third two-position (on-off) solenoid valve 1092 includes an inlet port 1092A which receives hydraulic fluid through a fifth branch 1072E of the branching manifold 1072. When the third two position solenoid valve 1092 is energized, the spool of the third logic valve 1090 translates to the left in FIG. 2C; when the third two position solenoid valve 1092 is de-energized, the spool of the third logic valve 1090 translates to the right, returning hydraulic fluid to the sump 102 through an exhaust port 1092C. A pair of hydraulic lines 1094 and 1103 communicate between the first and third outlet ports 1090G and 1090H of the third logic valve 1090 and two ports 1098A and 1098B at opposite ends of a third, preferably dual area piston and cylinder assembly 1100 which includes a cylinder 1098 and a piston 1102. The third piston and cylinder assembly 1100 translates the third shift rail and fork assembly 94A to select one of two gears.

A hydraulic line 1104 connected to the second outlet port 1090I communicates with a first inlet port 1530A of a fourth spool or logic valve 1530 and a hydraulic line 1113 connected to the fourth outlet port 1090J communicates with a second inlet port 1530B of the fourth logic valve 1530. A control port 1530C at the right end of the fourth logic valve 1530 is selectively supplied with pressurized hydraulic fluid from the outlet port 1062B of the second two position (on-off) solenoid valve 1062 (illustrated in FIG. 2B) in a line 1532. Thus, the spool of the fourth logic valve 1530 translates in unison with the spool of the second logic valve 1060. Alternately, the forth logic valve 1530 could be controlled by an additional on/off valve without changing the function of the control system 1700. However, to reduce components a single on/off valve was used to pilot two logic valves. When the second two position (on-off) solenoid valve 1062 is energized, both spools translate to the left as viewed in FIGS. 2B and 2C. When the second two position solenoid valve 1062 is de-energized, both spools translate to the right.

The fourth logic valve 1530 includes a first outlet port 1530G which communicates through a line 1536 to a port 1538A at one end of a fourth piston and cylinder assembly 1540 having a cylinder 1538 and a piston 1542 which is coupled to the fourth shift rail and fork assembly 94B and selects a single gear. A port 1538B at the other end of the fourth piston and cylinder assembly 1542 communicates through a line 1544 to a third outlet port 1530H. Similarly, a second outlet port 1530I communicates through a line 1546 to a port 1548A at one end of a fifth, preferably dual area piston and cylinder assembly 1550 having a cylinder 1548 and a piston 1552 which is coupled to the fifth shift rail and fork assembly 94C which selects one of two gears. The other end of the fifth piston and cylinder assembly 1550 includes a port 1538B which communicates through a line 1554 to a fourth outlet port 1530J.

Operation of the first embodiment of the hydraulic control system 1700 essentially involves the selection of a desired gear ratio in the transmission 60 by the transmission control module TCM and selection and activation of the pressure or flow control solenoid valves 1030 and 1430 to provide controlled flow and pressure of hydraulic fluid to the logic valves 1040, 1060, 1090 and 1530 and activation of the two position solenoid valves 1042, 1062 and 1092 to position the logic valve spools to direct pressurized hydraulic fluid flow to the correct sides of the piston and cylinder assemblies 1070, 1080, 1100, 1540 and 1550 to translate the shift rails 84A, 84B, 94A, 94B and 94C to engage the desired gear. Once this has occurred, the input clutch 64A or 64B associated with the countershaft 68A, 68B or 68C of the selected gear is engaged by activation of one of the piston and cylinder assemblies 160 or 210.

A convenient example of operation may be presented by describing same with the spools of the logic valves 1040, 1060, 1090 and 1530 in the positions illustrated in FIGS. 2B and 2C. Activation of the first pressure or flow control solenoid valve 1030 provides hydraulic fluid to the line 1432, through the first logic valve 1040, through the line 1046 to the second logic valve 1060 and through the line 1064 to the port 1068A in the first piston and cylinder assembly 1070. The piston 1072 and the first shift rail 84A will then translate to the right (to the left in FIG. 1) and engage, for example, sixth gear. The shift is completed by engaging the appropriate input clutch. If, on the other hand, the second pressure or flow control solenoid valve 1430 is activated, hydraulic fluid flow occurs through the lines 1434, 1048 and 1073, either returning the first shift rail 84A to neutral or moving the shift rail 84A all the way to the left to the position illustrated in FIG. 2B to engage, for example, second gear. The choice of the center (neutral) or left position is commanded by the transmission control module TCM with linear position information from, for example, the first linear position sensor 88A illustrated in FIG. 1. It should be appreciated that all the pistons 1072, 1082, 1102, 1542 and 1552 may, if desired, be dual area pistons or may be single area pistons with associated feedback and control assemblies or combinations thereof, as illustrated. A similar pattern of valve activation and logic valve spool translation provides the seven forward and reverse gears of the transmission 60.

Referring now to FIGS. 1, 3A, 3B and 3C, a second embodiment of a hydraulic control system according to the present invention is illustrated and generally designated by the reference number 1800. The second embodiment 1800 of the hydraulic control system, as stated, includes, in common with the other embodiment, the pump 110, the filters 106 and 118, the accumulator 130 and the other components of the hydraulic fluid supply and thus they will not be further described. It should be noted that the filters 106 and/or 118 can be omitted without departing from the scope of this invention.

The second embodiment 1800 of the hydraulic control system is the same as the first embodiment 1700 illustrated in FIGS. 2A, 2B and 2C except that a passive feed limit regulator assembly 1310 replaces the pressure control solenoid valve 140. A simplified version can also be envisioned by removing all valves between the main supply line 126 and the branching manifold 1702 in which the clutch and gear controls and actuators are fed directly by the accumulator 130.

Referring then briefly to FIG. 4, the main supply line 126 communicates with an inlet port 1308 of the passive feed limit regulator assembly 1310 which includes a generally cylindrical housing 1312 which slidably receives a spool 1314 having a pair of spaced-apart lands 1314A and 1314B. The passive feed limit regulator assembly 1310 also includes an outlet port 1316 which is in fluid communication with the branching manifold 1702. The outlet port 1316 is also in fluid communication with a control port 1322 through a flow restricting orifice 1324. At the opposite end of the passive feed limit regulator assembly 1310 from the control port 1322 is a compression spring 1326. The compression spring 1326 biases and drives the spool 1314 to the left as illustrated in FIGS. 3A and 4, which allows communication and fluid flow between the inlet port 1308 and the outlet port 1316. As hydraulic pressure builds in the outlet port 1316, the manifold 1702 and the control port 1322, the spool 1314 will be driven to the right in FIGS. 3A and 4, which closes off fluid flow between the inlet port 1312 and the outlet port 1316. Sufficient pressure at the control port 1322 will completely terminate the flow of hydraulic fluid through the feed limit regulator assembly 1310.

Referring again to FIGS. 3A, 3B and 3C, the second embodiment 1800 includes the components associated with activation of the first clutch 64A, such as the first electric pressure or flow clutch control solenoid valve 154, the orifice 156, the first clutch piston and cylinder assembly 160 and the first clutch pressure limit control valve 166 as well as the components associated with activation of the second clutch 64B, such as the second electric pressure or flow clutch control solenoid valve 204, the orifice 206, the second clutch piston and cylinder assembly 210 and the second clutch pressure limit control valve 216.

The second embodiment 1800 also includes the fourth branch 1702D of the manifold 1702 which communicates with the inlet port 1030A of the first electric pressure or flow control solenoid valve 1030. The outlet port 1030B is connected by the first hydraulic line 1432 with the first inlet port 1040A of the first spool or logic control valve 1040. The exhaust port 1030C communicates with the sump 102. The fourth branch 1702D of the manifold 1702 also communicates with the inlet port 1430A of the second electric pressure or flow control solenoid valve 1430. The second hydraulic line 1434 communicates between the outlet port 1430B and the second inlet port 1040B of the first spool or logic valve 1040. The exhaust port 1430C communicates with the sump 102.

The first spool or logic valve 1040 includes the control port 1040C which is selectively supplied pressurized hydraulic fluid from the outlet port 1042B of the first two position solenoid (on-off) valve 1042 which receives pressurized hydraulic fluid at the inlet port 1042A from the third branch 1702C of the manifold 1702. Energizing the first two position solenoid valve 1042 translates the spool of the first logic valve 1040 to the left in FIG. 3B; de-energizing it translates the spool of the first logic valve 1040 to the right and returns hydraulic fluid to the sump 102 through the exhaust port 1042C. The first spool or logic valve 1040 also includes three exhaust ports 1040D, 1040E, and 1040F disposed between and alternating with the inlet ports 1040A and 1040B which communicate with the sump 102.

The hydraulic line 1046 communicates between the first outlet port 1040G of the first spool or logic valve 1040 and the first input port 1060A of the second spool or logic valve 1060. Another hydraulic line 1048 communicates between the third outlet port 1040H and the second input port 1060B. Another hydraulic line 1052 connects the fourth outlet port 1040J to the first inlet port 1090A of the third spool or logic valve 1090. Another hydraulic line 1054 connects the second outlet port 1040I to the second inlet port 1090B of the third spool or logic valve 1090.

The second spool or logic valve 1060 includes the control port 1060C, the second two position (on-off) solenoid valve 1062 and three exhaust ports 1060D, 1060E, and 1060F which communicate with the sump 102. The inlet port 1062A of the second two position solenoid valve 1062 receives hydraulic fluid through the third branch 1702C of the manifold 1702 and selectively supplies it through the outlet port 1062B to the control port 1060C of the second logic valve 1060. Energizing the second two position solenoid valve 1062 translates the spool of the second logic valve 1060 to the left in FIG. 3B; de-energizing it translates the spool of the second logic valve 1060 to the right, returning hydraulic fluid through the exhaust port 1060C to the sump 102.

The two hydraulic lines 1064 and 1073 communicate between the first and the third outlet ports 1060G and 1060H of the second logic valve 1060 and two ports 1068A and 1068B in opposite ends of the first, preferably dual area piston and cylinder assembly 1070 which includes the cylinder 1068 and the piston 1072. The first piston and cylinder assembly 1070 translates the first shift rail and fork assembly 84A. The two hydraulic lines 1074 and 1083 communicate between the second and the fourth outlet ports 1060I and 1060J of the second logic valve 1060 and the ports 1078A and 1078B at opposite ends of the second piston and cylinder assembly 1080 which includes the cylinder 1078 and the piston 1082. The second piston and cylinder assembly 1080 translates the second shift rail and fork assembly 84B.

The third spool or logic valve 1090 includes the control port 1090C and three exhaust ports 1090D, 1090E, and 1090F which communicate with the sump 102. The inlet port 1092A of the third two position solenoid valve 1092 receives hydraulic fluid through the fifth branch 1072E of the manifold 1072. Energizing the third two position solenoid valve 1092 translates the spool of the third logic valve 1090 to the left in FIG. 3C; de-energizing it translates the spool of the third logic valve 1090 to the right, returning hydraulic fluid to the sump 102 through the exhaust port 1092C. The pair of hydraulic lines 1094 and 1103 communicate between the first and the third outlet ports 1090G and 1090H of the third logic valve 1090 and the ports 1098A and 1098B at opposite ends of the third, preferably dual area piston and cylinder assembly 1100 which includes the cylinder 1098 and the piston 1102. The third piston and cylinder assembly 1100 translates the third shift rail and fork assembly 94A.

The hydraulic line 1104 connects the second outlet port 1090I of the third logic valve 1090 to the first inlet port 1530A of the fourth spool or logic valve 1530 and the hydraulic line 1113 connects the fourth outlet port 1090J to the second inlet port 1530B. The control port 1530C at the right end of the fourth logic valve 1530 is selectively supplied with pressurized hydraulic fluid from the outlet port 1062B of the second two position (on-off) solenoid valve 1062 (illustrated in FIG. 3B) in a line 1532. Thus, the spool of the fourth logic valve 1530 translates in unison with the spool of the second logic valve 1060. When the second two position solenoid valve 1062 is energized, both spools translate to the left as viewed in FIGS. 3B and 3C. When the second two position solenoid valve 1062 is de-energized, both spools translate to the right.

The fourth logic valve 1530 includes the first outlet port 1530G which communicates through the line 1536 to the port 1538A at one end of the fourth piston and cylinder assembly 1540 having the cylinder 1538 and the piston 1542 which is coupled to the fourth shift rail and fork assembly 94B. The port 1538B at the other end of the fourth piston and cylinder assembly 1542 communicates through the line 1544 to the third outlet port 1530H. Similarly, the second outlet port 1530I communicates through the line 1546 to the port 1548A at one end of the fifth, preferably dual area piston and cylinder assembly 1550 having the cylinder 1548 and the piston 1552 which is coupled to the fifth shift rail and fork assembly 94C. The other end of the fifth piston and cylinder assembly 1550 includes the port 1538B which communicates through the line 1554 to the fourth outlet port 1530J.

It will be appreciated that the two hydraulic control systems of the present invention achieve significant improvements in reduced energy consumption and shift performance not only because of the incorporation of the dedicated electric pump and accumulator but also because of the use of pressure and flow control solenoid valves which allow the majority of the hydraulic system components to be turned off in normal, steady-state, operation. Additionally, these solenoid valves and the linear position sensors on each piston and cylinder shift actuator assembly which provide real time data to the transmission control module regarding the instantaneous positions of the actuators, shift rails and clutches, achieve gear selection and clutch operation that is rapid, positive and efficient without overshoot and wasted energy.

It should also be appreciated that the incorporation of the branching manifold and the supply of hydraulic fluid to both of the clutch operators in both embodiments provides improved operational flexibility as pressurized hydraulic fluid is essentially always available to engage the transmission clutches.

Similarly, the configurations of the two embodiments and the position feedback provided by the linear position sensors permits and facilitates rapid gear sequencing and improved, i.e., reduced, shift times.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for a dual clutch transmission comprising, in combination,
   a source of pressurized hydraulic fluid having a pump,
   a pressure control device having an inlet communicating with said source of hydraulic fluid and a pressure outlet,
   a first clutch actuator assembly in fluid communication with said pressure outlet and including a first piston and cylinder assembly and a first solenoid valve for selectively supplying hydraulic fluid to said first piston and cylinder assembly,
   a second clutch actuator assembly in fluid communication with said pressure outlet and including a second piston and cylinder assembly and a second solenoid valve for selectively supplying hydraulic fluid to said second piston and cylinder assembly,
   a first pressure or flow control solenoid valve having an inlet connected to said pressure outlet and an outlet,
   a second pressure or flow control solenoid valve having an inlet connected to said pressure outlet and an outlet,
   a first logic valve having a first inlet connected to said outlet of said first pressure or flow control solenoid and a second inlet connected to said outlet of said second pressure control solenoid valve, a plurality of exhaust ports, a control port, a first outlet, a second outlet, a third outlet and a fourth outlet,
   a third solenoid valve for selectively providing hydraulic fluid to said control port of said first logic valve,
   a second logic valve having a first inlet connected to said first outlet of said first logic valve, a second inlet connected to said third outlet of said first logic valve, a plurality of exhaust ports, a control port, a first outlet, a second outlet, a third outlet and a fourth outlet,
   a fourth solenoid valve for selectively providing hydraulic fluid to said control port of said second logic valve,
   a first gear selection piston and cylinder assembly having a first port connected to said first outlet of said second logic valve and a second port connected to said to said third outlet of said second logic valve,
   a second gear selection piston and cylinder assembly having a first port connected to said second outlet of said second logic valve and a second port connected to said to said fourth outlet of said second logic valve,
   a third logic valve having a first inlet connected to said fourth outlet of said first logic valve and a second inlet connected to said second outlet of said first logic valve, a plurality of exhaust ports, a control port, a first outlet, a second outlet, a third outlet and a fourth outlet,
   a third solenoid valve for selectively providing hydraulic fluid to said control port of said third logic valve,
   a third gear selection piston and cylinder assembly having a first port connected to said first outlet of said third logic valve and a second port connected to said to said third outlet of said third logic valve,
   a fourth logic valve having a first inlet connected to said second outlet of said third logic valve and a second inlet connected to said fourth outlet of said third logic valve, a plurality of exhaust ports, a control port, a first outlet, a second outlet, a third outlet and a fourth outlet,
   a fourth gear selection piston and cylinder assembly having a first port connected to said first outlet of said fourth logic valve and a second port connected to said third outlet of said fourth logic valve, and
   a fifth gear selection piston and cylinder assembly having a first port connected to said second outlet of said fourth logic valve and a second port connected to said to said fourth outlet of said fourth logic valve.

2. The hydraulic control system of claim 1 wherein said control port of said fourth logic valve is connected to said control port of said second logic valve.

3. The hydraulic control system of claim 1 further including a linear position sensor operably associated with each of said gear selection piston and cylinder assemblies.

4. The hydraulic control system of claim 1 further including a transmission control module having a plurality of inputs and outputs, said outputs operably coupled to said valves and a linear position sensor for sensing the output of each of said gear selection piston and cylinder assemblies and having an output coupled to one of said control module inputs.

5. The hydraulic control system of claim 1 wherein said pressure control device is a pressure control solenoid valve.

6. The hydraulic control system of claim 1 wherein said source of pressurized hydraulic fluid includes an accumulator, a filter and a check valve.

7. The hydraulic control system of claim 1 wherein said pressure control device is a passive feed limit valve having an inlet, a spool valve having two spaced-apart lands, a control port, an outlet and a flow restrictor disposed in fluid communication between said outlet and said control port.

8. A hydraulic control system for a dual clutch transmission comprising, in combination,
   a source of pressurized hydraulic fluid having a pump,
   a passive feed limit device having an inlet communicating with said source of hydraulic fluid and a pressure outlet,
   a first clutch actuator assembly in fluid communication with said pressure outlet and including a first piston and cylinder assembly and a first solenoid valve for selectively supplying hydraulic fluid to said first piston and cylinder assembly,
   a second clutch actuator assembly in fluid communication with said pressure outlet and including a second piston and cylinder assembly and a second solenoid valve for selectively supplying hydraulic fluid to said second piston and cylinder assembly,
   a first pressure or flow control solenoid valve having an inlet connected to said pressure outlet and an outlet,
   a second pressure or flow control solenoid valve having an inlet connected to said pressure outlet and an outlet,
   a first logic valve having a first inlet connected to said outlet of said first pressure or flow control solenoid and a second inlet connected to said outlet of said second pressure control solenoid valve, a plurality of exhaust ports, a control port, a first outlet, a second outlet, a third outlet and a fourth outlet,
   a third solenoid valve for selectively providing hydraulic fluid to said control port of said first logic valve,
   a second logic valve having a first inlet connected to said first outlet of said first logic valve, a second inlet connected to said third outlet of said first logic valve, a plurality of exhaust ports, a control port, a first outlet, a second outlet, a third outlet and a fourth outlet,
   a fourth solenoid valve for selectively providing hydraulic fluid to said control port of said second logic valve,
   a first gear selection piston and cylinder assembly having a first port connected to said first outlet of said second logic valve and a second port connected to said to said third outlet of said second logic valve,
   a second gear selection piston and cylinder assembly having a first port connected to said second outlet of said second logic valve and a second port connected to said to said fourth outlet of said second logic valve,
   a third logic valve having a first inlet connected to said fourth outlet of said first logic valve and a second inlet connected to said second outlet of said first logic valve, a plurality of exhaust ports, a control port, a first outlet, a second outlet, a third outlet and a fourth outlet, a third gear selection piston and cylinder assembly having a first port connected to said first outlet of said third logic valve and a second port connected to said to said third outlet of said third logic valve, a fourth logic valve having a first inlet connected to said second outlet of said third logic valve and a second inlet connected to said fourth outlet of said third logic valve, a plurality of exhaust ports, a control port, a first outlet, a second outlet, a third outlet and a fourth outlet, a fourth gear selection piston and cylinder assembly having a first port connected to said first outlet of said fourth logic valve and a second port connected to said third outlet of said fourth logic valve, and a fifth gear selection piston and cylinder assembly having a first port connected to said second outlet of said fourth logic valve and a second port connected to said to said fourth outlet of said fourth logic valve.

9. The hydraulic control system of claim 8 wherein said control port of said fourth logic valve is connected to said control port of said second logic valve.

10. The hydraulic control system of claim 8 further including a linear position sensor operably associated with each of said gear selection piston and cylinder assemblies.

11. The hydraulic control system of claim 8 further including a transmission control module having a plurality of inputs and outputs, said outputs operably coupled to said valves and a linear position sensor for sensing the output of each of said gear selection piston and cylinder assemblies and having an output coupled to one of said control module inputs.

12. The hydraulic control system of claim 8 wherein said source of pressurized hydraulic fluid includes an accumulator, a filter and a check valve.

13. The hydraulic control system of claim 8 wherein said passive feed limit device is a regulator valve having an inlet, a spool valve having two spaced-apart lands, a control port and an outlet port.

14. A hydraulic control system for a dual clutch transmission comprising, in combination, a source of pressurized hydraulic fluid having an electric pump, a pressure control solenoid valve having an inlet communicating with said source of hydraulic fluid and a pressure outlet, a first clutch actuator assembly in fluid communication with said pressure outlet and including a first piston and cylinder assembly and a first solenoid valve for selectively supplying hydraulic fluid to said first piston and cylinder assembly, a second clutch actuator assembly in fluid communication with said pressure outlet and including a second piston and cylinder assembly and a second solenoid valve for selectively supplying hydraulic fluid to said second piston and cylinder assembly, a first pressure or flow control solenoid valve having an inlet connected to said pressure outlet and an outlet, a second pressure or flow control solenoid valve having an inlet connected to said pressure outlet and an outlet, a first logic valve having a first inlet connected to said outlet of said first pressure or flow control solenoid and a second inlet connected to said outlet of said second pressure control solenoid valve, a plurality of exhaust ports, a control port, a first outlet, a second outlet, a third outlet and a fourth outlet, a second logic valve having a first inlet connected to said first outlet of said first logic valve, a second inlet connected to said third outlet of said first logic valve, a plurality of exhaust ports, a control port, a first outlet, a second outlet, a third outlet and a fourth outlet, a first gear selection piston and cylinder assembly having a first port connected to said first outlet of said second logic valve and a second port connected to said to said third outlet of said second logic valve, a second gear selection piston and cylinder assembly having a first port connected to said second outlet of said second logic valve and a second port connected to said to said fourth outlet of said second logic valve, a third logic valve having a first inlet connected to said fourth outlet of said first logic valve and a second inlet connected to said second outlet of said first logic valve, a plurality of exhaust ports, a control port, a first outlet, a second outlet, a third outlet and a fourth outlet, a third gear selection piston and cylinder assembly having a first port connected to said first outlet of said third logic valve and a second port connected to said to said third outlet of said third logic valve, a fourth logic valve having a first inlet connected to said second outlet of said third logic valve and a second inlet connected to said fourth outlet of said third logic valve, a plurality of exhaust ports, a control port, a first outlet, a second outlet, a third outlet and a fourth outlet, a fourth gear selection piston and cylinder assembly having a first port connected to said first outlet of said fourth logic valve and a second port connected to said third outlet of said fourth logic valve, and a fifth gear selection piston and cylinder assembly having a first port connected to said second outlet of said fourth logic valve and a second port connected to said to said fourth outlet of said fourth logic valve.

15. The hydraulic control system of claim 14 wherein said control port of said fourth logic valve is connected to said control port of said second logic valve.

16. The hydraulic control system of claim 14 further including a linear position sensor operably associated with each of said gear selection piston and cylinder assemblies.

17. The hydraulic control system of claim 14 further including a transmission control module having a plurality of inputs and outputs, said outputs operably coupled to said valves and a linear position sensor for sensing the output of each of said gear selection piston and cylinder assemblies and having an output coupled to one of said control module inputs.

18. The hydraulic control system of claim 14 further including a plurality of two position solenoid valves for selectively providing hydraulic fluid to said control ports of said logic valves.

* * * * *